(12) United States Patent
Chen

(10) Patent No.: US 7,443,598 B2
(45) Date of Patent: Oct. 28, 2008

(54) VARIABLE FOCAL LENGTH LENS

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 78 days.

(21) Appl. No.: 11/309,566

(22) Filed: Aug. 24, 2006

(65) Prior Publication Data
US 2007/0165301 A1     Jul. 19, 2007

(30) Foreign Application Priority Data
Jan. 14, 2006     (CN) .......................... 2006 1 0032953

(51) Int. Cl.
  *G02B 3/14*     (2006.01)
  *G02F 1/09*     (2006.01)
(52) U.S. Cl. ...................................... 359/666; 359/280

(58) Field of Classification Search ................. 359/665, 359/666, 280
See application file for complete search history.

(56) References Cited

U.S. PATENT DOCUMENTS 5,739,959 A * 4/1998 Quaglia ...................... 359/666
6,930,838 B2   8/2005 Schachar

FOREIGN PATENT DOCUMENTS

WO    WO 2005/119308 A1    12/2005

\* cited by examiner

*Primary Examiner*—William C Choi

(57) ABSTRACT

A variable focal length lens (12) includes a central transparent elastic portion (120) having a first wall (1200) and a second wall (1202) intersecting an optical axis and a peripheral portion (122) surrounding the body. The first wall and the second wall joined with the periphery form a container (124). The container is filled with magnetic fluid (126).

20 Claims, 4 Drawing Sheets

VARIABLE FOCAL LENGTH LENS

FIELD OF THE INVENTION

The present invention relates to lenses, and particularly to a variable focal length lens.

DESCRIPTION OF RELATED ART

Variable focal length lenses are widely used in optical systems. Optical systems incorporating such lenses can, for example, provide focused images of objects at varying distances from the lens to an image plane without changing the distance between the lens and the image plane. Variable focal length lenses can also be used in optical systems that provide varying magnification without changing lenses.

Many types of variable focal length lenses have been devised. The design most widely used at present in optical instruments, such as cameras, telescopes, binoculars and microscopes, is a multi-element lens module wherein the focal length is varied by changing the internal spacing of one or more of the elements along the optical axis. Generally, the lens system usually uses an actuator, such as step motor, to drive the lens module. However, the step motor is relatively large in volume and consumes a substantial amount of power, especially relative to the amount of power that can be stored in the typical battery system. Use of the step motor needs more space for movement of the lenses, which makes the lens system awkward and bulky.

Therefore, what is needed is a variable focal length lens adapted for variable focus optical system without the need for large mechanical movement.

SUMMARY OF THE INVENTION

According to an exemplary embodiment, a variable focal length lens includes a central transparent elastic portion having a first wall and a second wall intersecting an optical axis and a periphery surrounding the body. The first wall and the second wall joined with the periphery form a container. The container is filled with magnetic fluid.

BRIEF DESCRIPTION OF THE DRAWINGS

Many aspects of the present variable focal length lens can be better understood with reference to the following drawings. The components in the drawings are not necessarily drawn to scale, the emphasis instead being placed upon clearly illustrating the principles of the present variable focal length lens. Moreover, in the drawings, like reference numerals designate corresponding parts throughout the several views.

DETAILED DESCRIPTION OF THE INVENTION

Reference will now be made to the drawings to describe in detail the preferred embodiments of the present variable focal length lens.

Figure 1:
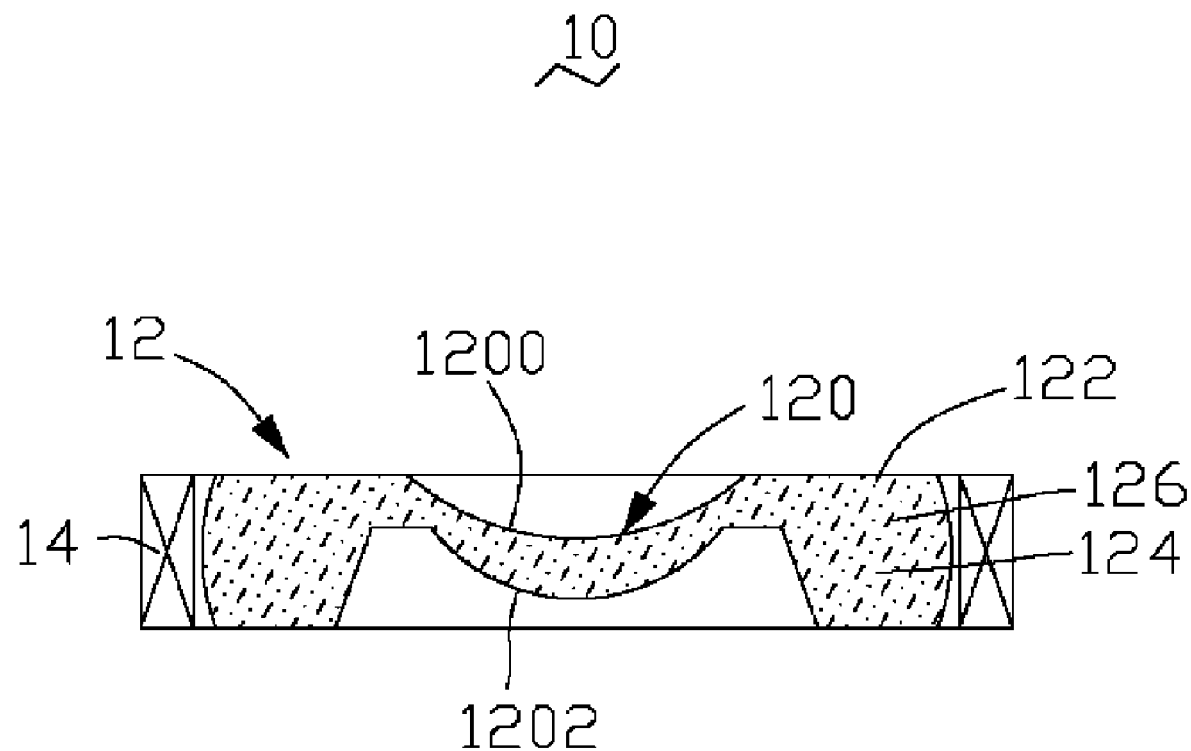
FIG. 1 is a schematic, cross-sectional views of an optical system in accordance with a preferred embodiment.

Referring to FIG. 1, a variable focal length lens assembly 10 mainly includes a variable focal length lens 12, and a magnetic field generating device 14. The variable focal length lens 12 includes a central transparent elastic portion 120 and a peripheral portion 122 surrounding the central transparent elastic portion 120. The central transparent elastic portion 120 has a first wall 1200 and a second wall 1202 intersecting an optical axis of the central transparent elastic portion 120. The central transparent elastic portion 120 and the peripheral portion 122 cooperatively form a container 124. The container 124 is filled with magnetic fluid 126. The magnetic field generating device 14 is arranged adjacent to the container 124. In the exemplary embodiment, the magnetic field generating device 14 surrounds the a variable focal length lens assembly 10 and is configured for exerting radial magnetic force on the magnetic fluid 126 in a direction from the peripheral portion 122 to a center of the central transparent elastic portion 120 of the variable focal length lens 12.

The lens 12 is applicable to all elastically deformable lenses in conventional lens shape, i.e., biconvex, biconcave, plane-convex, plane-concave, concave-convex, or biplane lenses, whether the surfaces are spherical, aspheric, cylindrical, toric or the like. That is, the lens 12 can form positive, negative and zero-power lenses of all types and thicknesses, including those of all shapes and wall thickness, whether of constant or variable wall thickness, Fresnel lenses, and diffractive optical elements. In the illustrated embodiment, the lens 12 is a concave-convex lens. The first wall 1200 of the lens is concave, and the second wall 1202 is convex.

The first wall 1200 and the second wall 1202 of the invention may be constructed of any optically suitable material that can undergo elastic deformation of sufficient magnitude to exhibit the change in optical power of the lens according to the embodiment. The material must be substantially transparent to wave lengths that are to be focused by the lens. Thus, lenses intended for use in the visible region of spectrum must be generally transparent at visible wavelengths, while lenses intended for use at infrared wavelengths must be transparent to infrared radiation, but not necessarily to visible radiation. Evidently, some scattering of radiation and optical imperfection can be tolerated in the lens if it is intended for non-critical use. However, in general the material should be as transparent as possible in the wavelength region of interest.

The first wall 1200 and the second wall 1202 of the lens used in the illustrated embodiment may be made, for example, of transparent materials such as silicone rubbers, polyethylene, polypropylene, modified polystyrenes, transparent polyurethane elastomers, polyethylene terephthalate, cyclic olefin copolymer (COC), or any combination thereof. Advantageously, in the illustrated embodiment, the first wall 1200 and the second wall 1202 are composed of COC. COC exhibits high transparency and good deformability. The transparency of COC is above 95%, it has a specific gravity of 1.01, and the specific elongation may extend 40%. It will be recognized by one skilled in the art that the material used should desirably exhibit high transparency, i.e., low optical absorbance and low light scattering at the wavelength of interest.

The magnetic fluid 126 includes a plurality of magnetic fine particles and transparent carrier liquid. The magnetic fine particles have an average grain size in the range from about 1 nm to about 200 nms, and preferably from 10 nms to 100 nms. The magnetic fine particles may be selected from cobalt, cobalt oxide, and any combination thereof. Advantageously, the magnetic fine particles are encapsulated within an outer capsule. The outer capsule can be composed of high molecular weight surfactant such as polyvinyl alcohol, oleic acid, linoleic acid, or the like. The transparent carrier liquid suitable for filling the lens includes one or more of water, aqueous solutions of water-soluble inorganic and organic solids, organic liquids, mixtures of water and water-miscible organic liquids or silicone oils. Organic liquids and soluble inorganic salts containing halogens such as chlorine, bromine and iodine in covalently bonded or ionic form are useful as filling materials of relatively high index. Mixtures of water and water-miscible organic compounds such as glycols and polyethylene glycols are useful as filling material. The refractive index of the magnetic fluid 126 can be in the range from about 1.5 to about 1.8, and should preferably be from 1.65 to 1.8.

The magnetic field generating device 14 may be magnetic coils, an electric solenoid, and etc. The magnetic field generating device 14 can be connected to an electric power source through an outer circuit. When a current is applied to the magnetic field generating device 14, the magnetic field generating device 14 exerts inward or outward radial magnetic force acting on the magnetic fluid. By changing the direction of current on the magnetic field generating device 14, the magnetic force can move the magnetic fluid 126 to the center or to the edge of the lens 12. The different current or magnetic force applied on the magnetic fluid 126 can induce different radii of curvature. Different radii of curvature may give different focal lengths on the lens 12 so that when it can be used in camera modules to carry out auto-focus and zoom functions.

The operation principle of the present optical system 10 is described as follows, using the coils as an example for the magnetic field generating device 14. In operation, (referring to FIG. 1) when no current is applied to the magnetic coils, there is no force acting on the magnetic fluid 126 in the lens 12, so the lens 12 keeps its originally condition.

Figure 2:
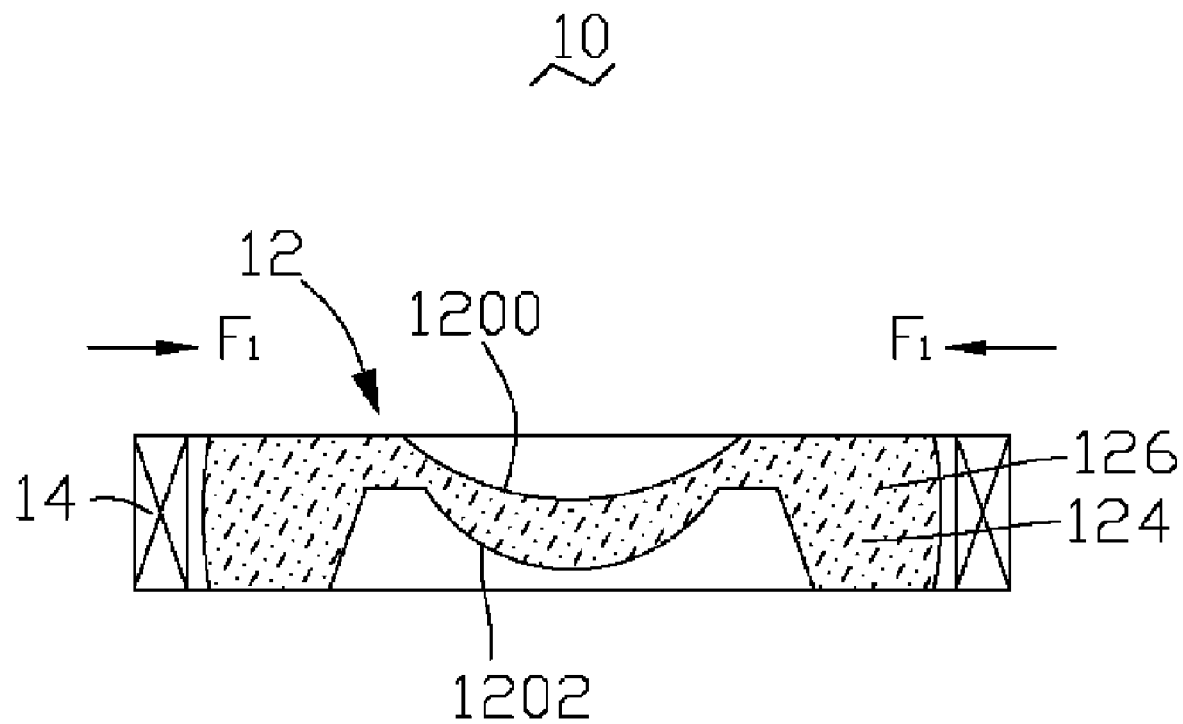
FIGS. 2 to 3 are schematic, cross-sectional views of the optical system of FIG. 1 in different conditions.

Referring to FIG. 2, when a current is applied to the magnetic coils, and the magnetic coils exert inward radial magnetic force, the magnetic particles in the magnetic fluid 126 react to the magnetic force and move to the center of the central transparent elastic portion 120. The center thickness of the lens 12 is increased with resulting decrease in the radii of the first wall 1200 and the second wall 1202, which causes the optical power of the lens 12 to be enhanced.

Figure 3:
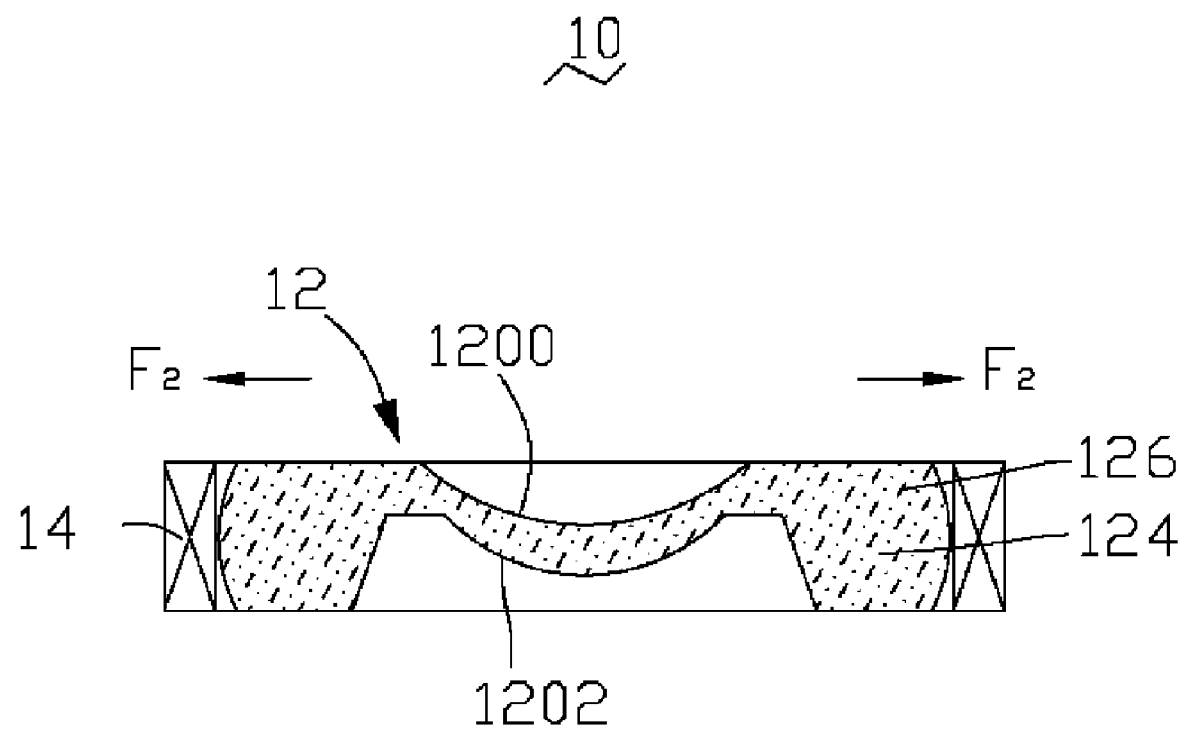

Referring to FIG. 3, when a current is applied to the magnetic coils, and the magnetic coils exert outward radial magnetic force, the magnetic particles in the magnetic fluid 126 react to the magnetic force and move to the peripheral portion 122 of the lens 12. The center thickness of the lens 12 is decreased with resulting increase in the radii of the first wall 1200 and the second wall 1202, which causes the optical power of the lens 12 to be reduced.

Figure 4:
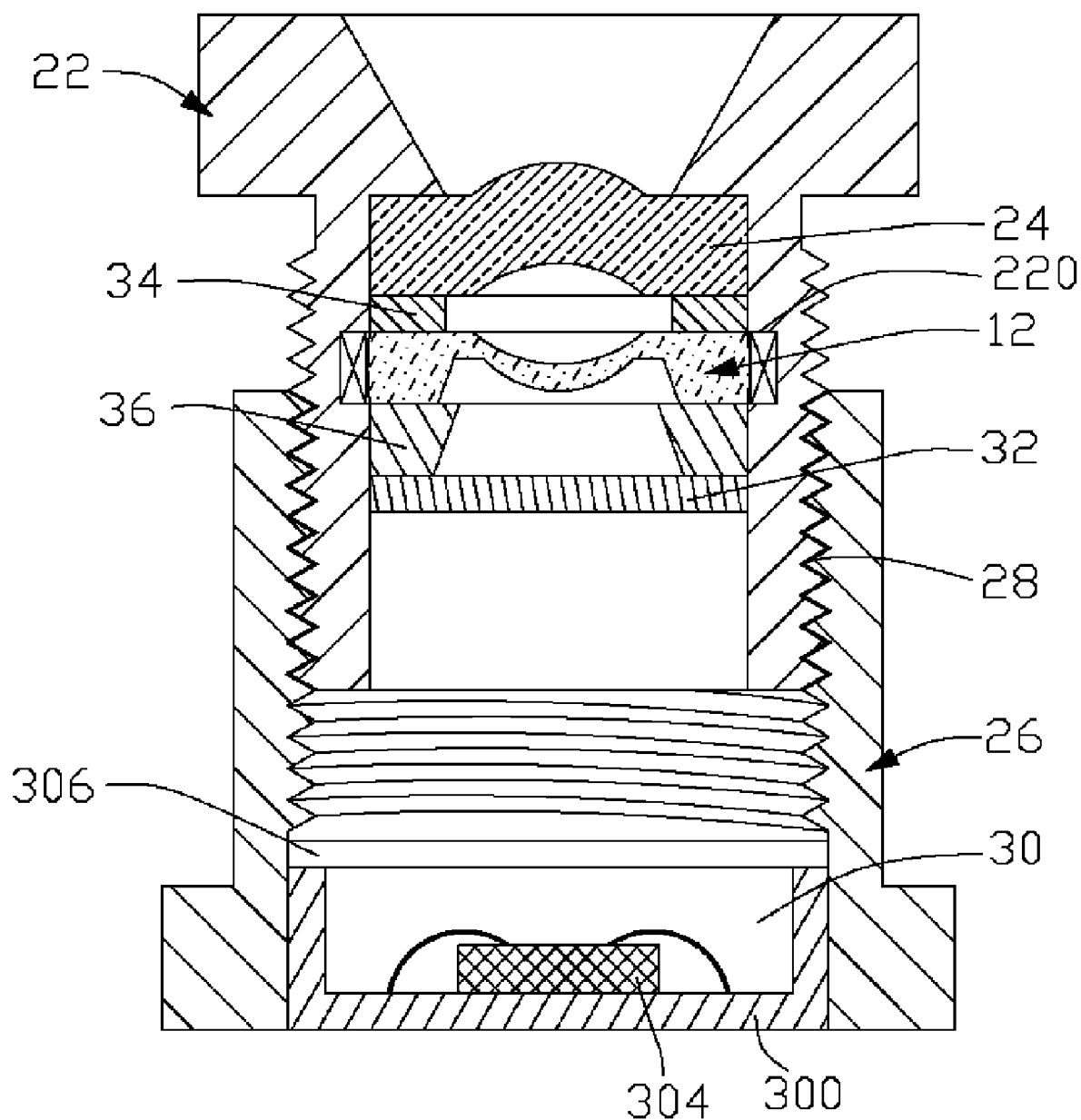
FIG. 4 is a schematic, cross-sectional view of an optical system in accordance with another preferred embodiment.

Referring to FIG. 1 and FIG. 4, in another embodiment, an optical system 20 mainly includes an inner barrel 22 with a groove 220 defined therein, the variable focal length lens 12, and the magnetic field generating device 14. The magnetic field generating device 14 mounted in the groove 220 is positioned about the center of the lens 12. The magnetic field generating device 14 is configured for exerting radial magnetic force on the magnetic fluid 126 in a direction from the peripheral portion 122 to a center of the central transparent elastic portion 120 of the variable focal length lens 12.

The optical system 20 further includes a second lens 24 coupled in the inner barrel 22, and an outer barrel 26. The outer barrel 26 is coupled with and movable relative to the inner barrel 22 through a screw portion 28. The second lens 24 is advantageously an aspheric lens, which can correct optical aberration.

In the illustrated embodiment, the optical system 20 further includes an image sensor device 30 mounted in the outer barrel 26. According to the illustrated embodiment, the image sensor device 30 is optically aligned with the variable focal length lens 12 and includes an enclosure 300 having an opening thereon, a sealing plate 302 covering the opening, and an image sensor 304 received in the enclosure 300. The sealing plate 302, according to the illustrated embodiment is a transparent glass plate. The image sensor 304 may be, for example, a sensitive film, a complementary metal-oxide semiconductor (CMOS) image sensor or a charge coupled device (CCD) image sensor. The image sensor 304 can be fixed on the bottom of the enclosure 300. In the illustrated embodiment, the image sensor device 30 is secured on the bottom of the outer barrel 26.

It is to be noted that, although two lenses 12, 24 are exemplarily illustrated herein, greater or fewer numbers of lens assemblies and lenses can be optionally employed by those skilled in the art, according to the principles of the present inventions and should be considered to be within the scope of the present invention. The optical system 20 can further include a filter 32, a lens aperture 34 set between the two lenses 12, 24, and the spacer 36 set between the lens 12 and the filter 32.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. A variable focal length lens comprising:
   a container comprising a central transparent elastic portion;
   a peripheral portion surrounding the central transparent elastic portion;
   a light-permeable magnetic fluid received in the container; and
   a magnetic field generating device arranged adjacent the container and configured for exerting a radial magnetic force on the magnetic fluid in a direction from the periphery to a center of the central transparent elastic portion.

2. The variable focal length lens as described in claim 1, wherein the central transparent elastic portion is comprised of a transparent material selected from the group consisting of silicone rubber, polyethylene, polypropylene, modified polystyrene, transparent polyurethane elastomer, polyethylene terephthalate, cyclic olefin copolymer, and any combination thereof.

3. The variable focal length lens as described in claim 1, wherein the magnetic fluid comprises a plurality of magnetic particles and a transparent carrier liquid.

4. The variable focal length lens as described in claim 3, wherein the magnetic particles have an average grain size in the range from about 1 nm to about 200 nms.

5. The variable focal length lens as described in claim 4, wherein the magnetic particles have an average grain size in the range from about 10 nms to about 100 nms.

6. The variable focal length lens as described in claim 3, wherein the magnetic particles consist of a material selected from the group consisting of cobalt, cobalt oxide, and any combination thereof.

7. The variable focal length lens as described in claim 3, wherein each magnetic particle comprises an outer capsule.

8. The variable focal length lens as described in claim 7, wherein the outer capsule is comprised of a polymer surfactant material selected from the group consisting of polyvinyl alcohol, oleic acid, linoleic acid, and olive oil.

9. The variable focal length lens as described in claim 3, wherein the carrier liquid is comprised of a material selected from the group consisting of water, aqueous solutions of water-soluble inorganic and organic solids, organic liquids, mixtures of water and water-miscible organic liquids and silicone oils.

10. The variable focal length lens as described in claim 1, wherein a refractive index of the magnetic fluid is in the range from about 1.5 to 1.8.

11. The variable focal length lens as described in claim 1, wherein the magnetic field generating device is a magnetic coil.

12. The variable focal length lens as described in claim 1, wherein the central transparent elastic portion is meniscus-shaped.

13. A lens module comprising:
a barrel;
a variable focal length lens as described in claim 1, the variable focal length lens being mounted in the barrel; and
a magnetic field generating device being disposed adjacent to the variable focal length lens.

14. The lens module as described in claim 13, wherein the central transparent elastic portion is meniscus-shaped.

15. The lens module as described in claim 13, wherein the central transparent elastic portion is comprised of a transparent material selected from the group consisting of silicone rubber, polyethylene, polypropylene, modified polystyrene, transparent polyurethane elastomer, polyethylene terephthalate, cyclic olefin copolymer, and any combination thereof.

16. The lens module as described in claim 13, wherein the magnetic fluid comprises a plurality of magnetic particles and a transparent carrier liquid.

17. The lens module as described in claim 13, wherein the magnetic particles are comprised of a material selected from the group consisting of cobalt, cobalt oxide, and any combination thereof.

18. A variable focal length lens comprising:
a container comprising a central transparent elastic portion;
a peripheral portion surrounding the central transparent elastic portion;
a light-permeable magnetic fluid received in the container; and
a magnetic coil arranged adjacent the container and configured for exerting a radial magnetic force on the magnetic fluid in a direction from the periphery to a center of the central transparent elastic portion.

19. The variable focal length lens as described in claim 18, wherein the magnetic fluid comprises a plurality of magnetic particles and a transparent carrier liquid.

20. The variable focal length lens as described in claim 19, wherein the magnetic particles consist of a material selected from the group consisting of cobalt, cobalt oxide, and any combination thereof.

\* \* \* \* \*